United States Patent
Meyer

[11] Patent Number: 6,002,764
[45] Date of Patent: Dec. 14, 1999

[54] PORTABLE UPRIGHT STANDING FLAP PHONE

[75] Inventor: Axel E. Meyer, Le Mans, France

[73] Assignee: U.S. Philips Corporation, New York, N.Y.

[21] Appl. No.: 08/984,255
[22] Filed: Dec. 3, 1997

[30] Foreign Application Priority Data

Dec. 6, 1996 [EP] European Pat. Off. .............. 96402658

[51] Int. Cl.⁶ ....................................................... H04M 1/00
[52] U.S. Cl. .............................................................. 379/433
[58] Field of Search ..................................... 379/433, 434, 379/428; 435/90, 575

[56] References Cited

U.S. PATENT DOCUMENTS 5,440,629  8/1995  Gray ......................................... 379/433
5,638,441  6/1997  Hattori et al. .......................... 379/433

FOREIGN PATENT DOCUMENTS

0492748A2  7/1992  European Pat. Off. ......... H04M 1/02
3244182A  10/1991  Japan ............................... H05K 1/03

Primary Examiner—Jack Chiang

[57] ABSTRACT

A telephone comprises a housing with a plurality of coverable control keys at the front and a cover that can be moved between a closed position in which said control keys are covered and an open position in which the control keys are accessible for operation. If desired, the cover and the housing can include an angle of approximately 90° in this position, so that the telephone can be put on a table or on another flat surface in an upright position. In addition to being pivotable, the cover is movable parallel to the housing between the closed position and a moved intermediate position, from which intermediate position the cover can be pivoted to the open position.

5 Claims, 4 Drawing Sheets

1

PORTABLE UPRIGHT STANDING FLAP PHONE

BACKGROUND OF THE INVENTION

The invention relates to a telephone with a housing that comprises a plurality of coverable control keys at the front and a cover movable between a closed position in which said control keys are covered and an open position in which the cover is flapped down around a pivot axis near to an edge of the housing, in which open position said control keys are accessible for operation.

Telephones of this type are known in various embodiments (EP 0 492 748 A2; Japanese published patent application 3-244182). The microphone of the telephone is known to be accommodated in the flap-down flap. The flap has for its object to minimize the dimensions of the telephone during the time the telephone is not used. It further has for its object to provide a protection of the control keys which cannot be depressed inadvertently due to the presence of the flap and in closed position of the flap.

A drawback of telephones of above type is that the flap is relatively vulnerable also in closed position. The flap is pivoted exclusively along an edge of the housing. The length of the flap in said known telephones is larger than the width of the flap, so that a relatively large lever arm is present for forces exerted near to the free end of the flap. Another drawback is that minor forces are already sufficient to open the flap, that is, partly, so that the flap is easily caught on an object, for example when the telephone is put away in the inside pocket of a piece of garment or in a bag.

OBJECTS AND SUMMARY OF THE INVENTION

It is an object of the invention to provide a telephone of the type defined in the opening paragraph for which the flap is less vulnerable and catches less easily on an object and is characterized in that the flap can be moved parallel to the housing between said closed position and an intermediate position and in that the cover can be pivoted around said pivot axis between the intermediate position and the open position. It is observed that slidable flaps on telephones are known per se (DE 4307 164 A1). Such flaps that can only slide, however, have the drawback that the flap in open position cannot be used as a support or base for putting the telephone upright on the table or another suitable underground.

An embodiment of the telephone according to the invention which makes a firm attachment of the cover to the housing of the telephone possible is characterized in that the cover in closed position comprises a main portion positioned substantially parallel to the front of the housing, and also side portions contiguous with the main portion near to the side edges, which side portions in closed position are located adjacent housing side faces contiguous with the front and in that the cover and the housing between said side faces of the cover and said side faces of the housing comprise mating guide portions for slidably guiding the cover on the housing between the closed position and the intermediate position and for allowing of the pivoting option of the cover relative to the housing in the intermediate position.

A following embodiment of the invention is characterized in that the cover in closed position leaves at least one control key uncovered. With this construction it is possible to cover control keys having, for example, critical double functions, whereas at the same time several control keys continue to be accessible, for example, for responding to an incoming call, selecting menu functions, etc. Preferably, the uncovered control keys are located at maximum distance from the pivot axis of the cover.

These and other aspects of the invention will be apparent from and elucidated with reference to the embodiments described hereinafter.

DETAILED DESCRIPTION OF THE PREFERRED EMBODIMENT

Figure 1:
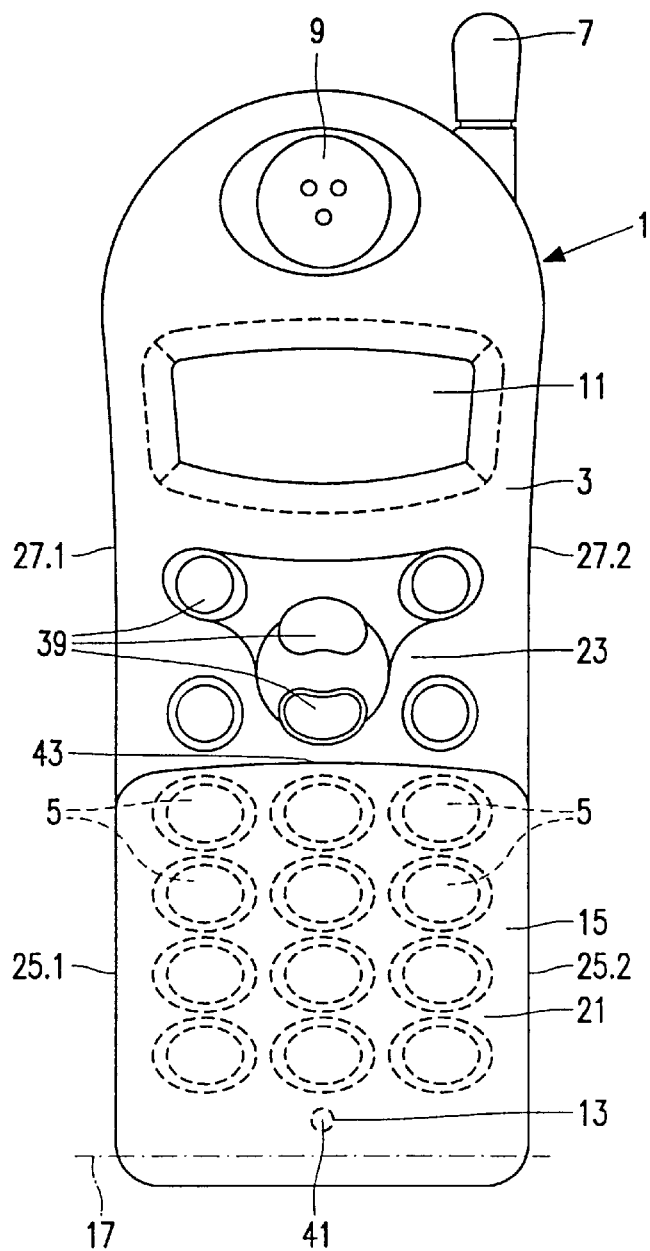
FIG. 1 is a front elevation of the telephone according to the invention, with a closed cover.

The Figures show a telephone 1 with a housing 3 which comprises a plurality of control keys 5 at the front. This relates to a portable wireless telephone which customarily comprises an antenna 7, a loudspeaker 9, an LCD display 11 and a microphone 13. The telephone 1 shows at the front a cover 15 that can be moved between the closed position shown in FIGS. 1, 2 and 3, in which said control keys 5 are covered, and an open position shown in FIG. 5 swung open around a pivot axis 17 near to an edge 19 of the housing 3. In the latter position, the control keys 5 are accessible for control and the cover and the housing 3 include an angle of approximately 90°. According to the invention, the cover 15 is slidable parallel to the housing 3 between said closed position and an intermediate position, see particularly FIGS. 3 and 4. The cover can be swung open to the open position shown in FIG. 5 starting from a slightly further intermediate position than shown in FIG. 4. In the latter position, the control keys 5 are freely accessible.

Figure 2:
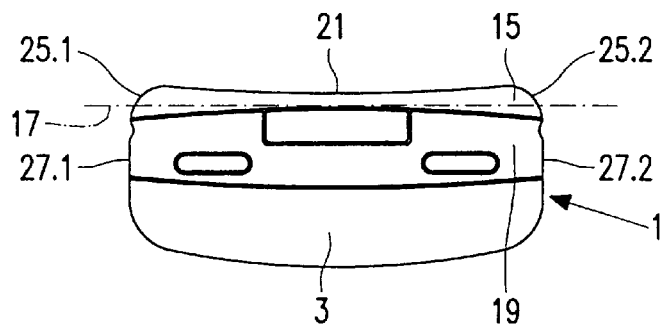
FIG. 2 is a bottom elevation of the telephone in the position of FIG. 1.
Figure 3:
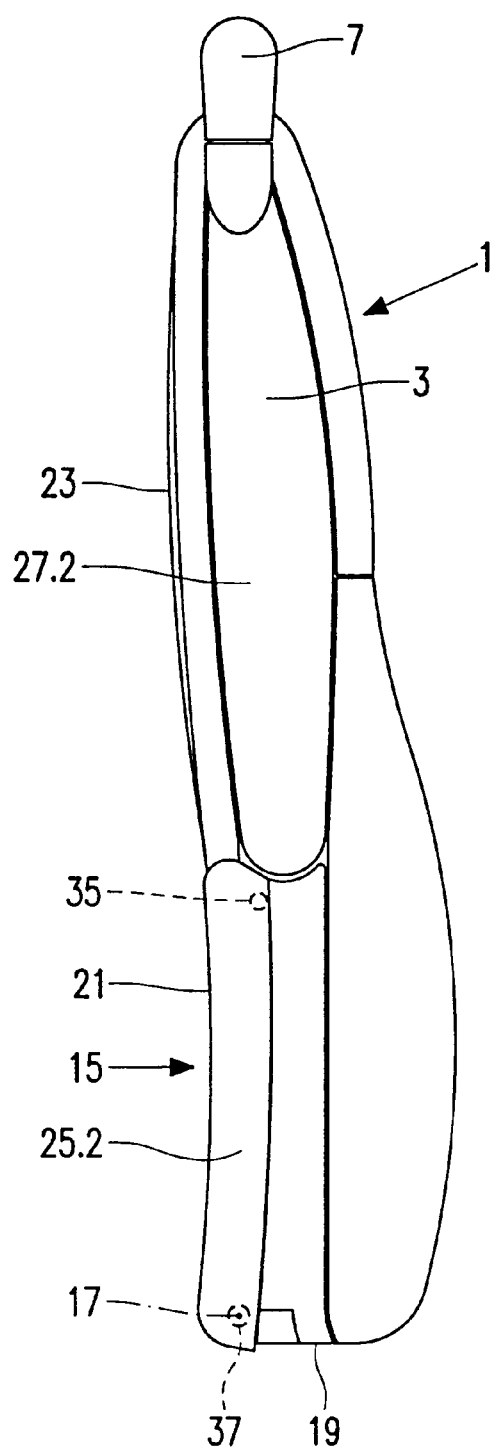
FIG. 3 is a side elevation of the telephone shown in FIGS. 1 and 2, with a closed cover.

The cover 15 has a main portion 21 which, in closed position, runs parallel to the front 23 of the housing 3, see particularly FIG. 3. Furthermore, the cover 15 has side portions 25.1 and 25.2 forming extensions to the side edges of the main part 21 which, in closed position, are located near to the side faces 27.1 and 27.2 respectively of the housing, which side faces are adjacent the front 23 of the housing. Between said side portions 25.1 and 25.2 of the cover and said side faces 27.1 and 27.2 of the housing, the cover 15 and the housing 3 comprise mating guide portions for slidably guiding the cover 15 on the housing 3 between the closed position shown in FIGS. 1, 2 and 3 and the intermediate position near to the position shown in FIG. 4, and also for allowing the cover 15 to pivot relative to the housing 3 in the intermediate position, to reach the open position shown in FIG. 5.

Figure 4:
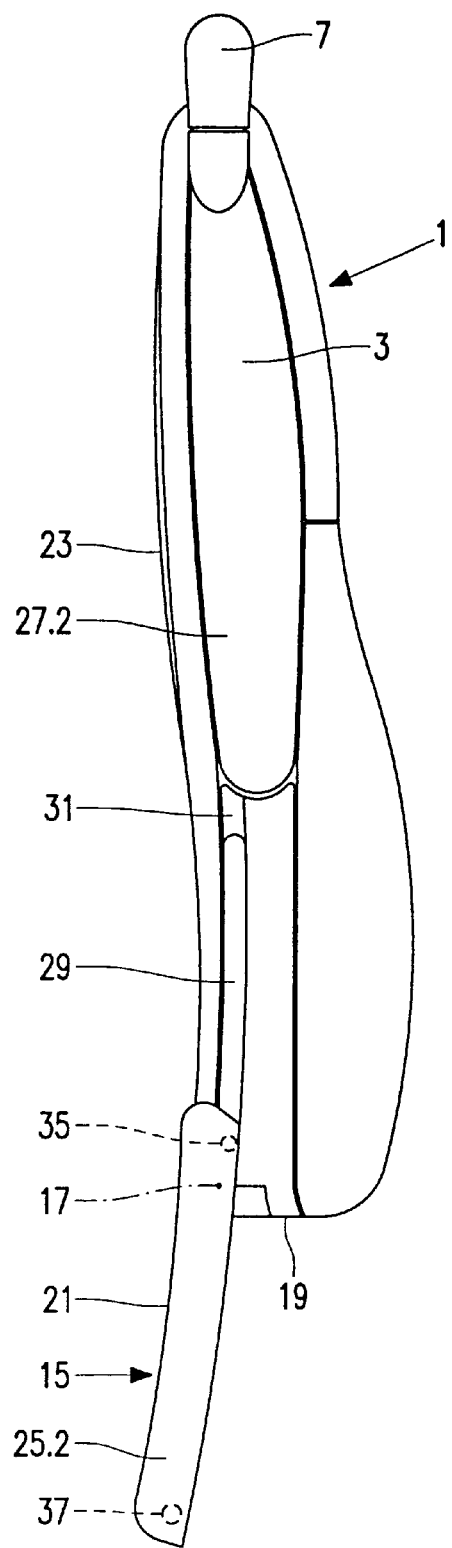
FIG. 4 is a side elevation as in FIG. 3, with the cover slid open to near to the intermediate position.
Figure 5:
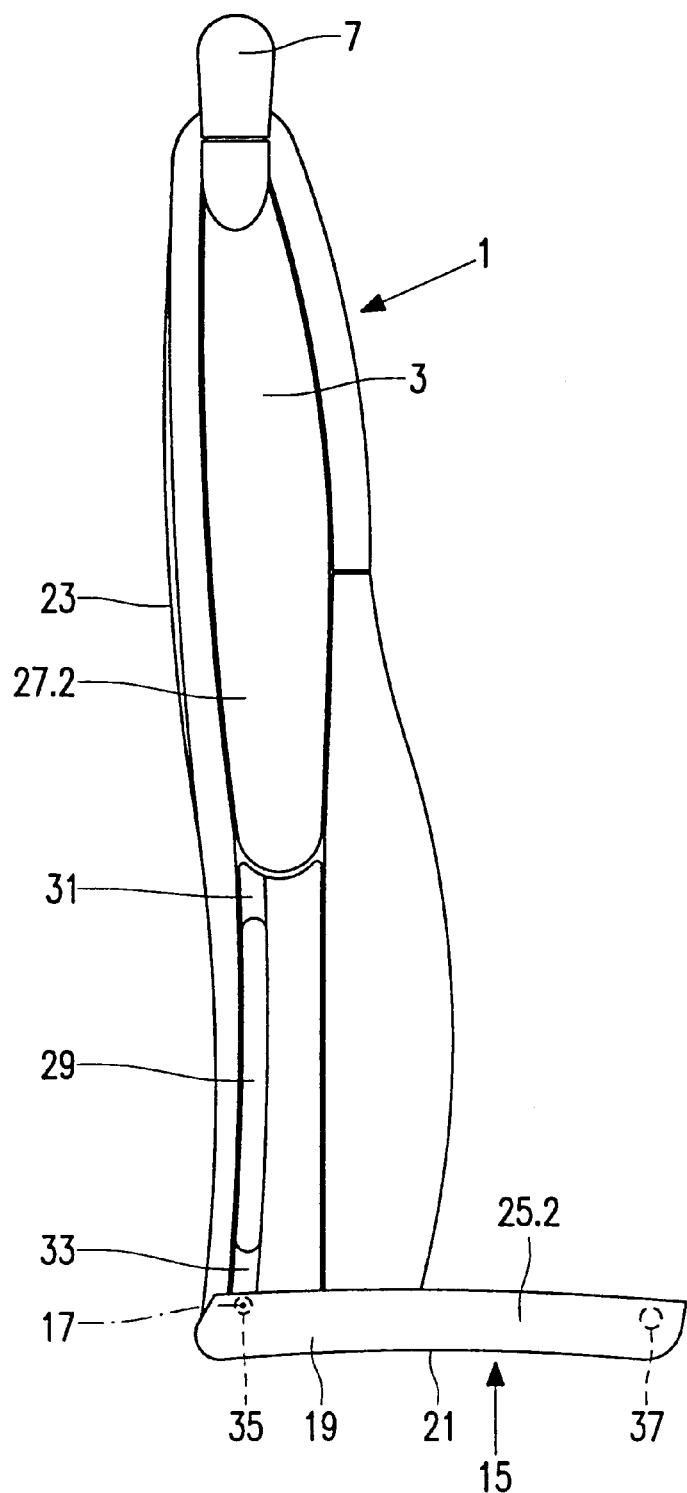
FIG. 5 is a side elevation as in FIGS. 3 and 4, in which the cover is swung open from the intermediate position.

Said guide portions for slidably guiding the cover 15 comprise, for example, a number of ridges and slots of the housing. In the FIGS. 4 and 5, a slot 29 can be observed which is bounded on either end by ridges 31, 33 respectively, which lie slightly below the surface of the further adjacent part of the side face 27.2 of the housing. Either side portion of the cover 15 comprises on the inside protrusions which mate with said slots and ridges. In FIGS. 3–5, these protrusions are symbolically shown by reference numerals 35 and 37, respectively. In the closed position shown in FIG. 3, the two protrusions 35, 37 respectively rest on the ridges 31, 33, respectively. Due to the elastic properties of the cover 15, which will generally be manufactured of a flexible plastic, the protrusions rest on the ridges while clamping, so that the cover is kept in place sufficiently firmly. In the position of FIG. 5, the protrusion 35 has reached the end of the ridge 33, so that the axis of the protrusion 35 coincides with the pivot axis 17 and the flap 15 can be swung to its position shown in FIG. 5.

In closed position, see particularly FIG. 1, a number of control keys 39 are left uncovered. The more critical control keys 5 are covered by the flap 15. The latter keys have double functions and inadvertently depressing them could lead to needless activation of the telephone. The control keys 39, on the other hand, may also be used for switching the telephone on and off, up and down scrolling on the LCD display 11, terminating the display on the LCD display 11 or controlling the menu functions of the telephone even when the cover is in closed position. In this manner, even when the cover 15 is closed, it remains possible to respond to and terminate an incoming call, and to use the preprogrammed menu functions, for example, for searching for a preprogrammed telephone number and dialling that number. The microphone 13 of the telephone is not covered when the flap is in closed position. In the main portion 21, the cover has an opening 41 which is located opposite the microphone 13 when the cover is closed. Obviously, when the telephone is used with the cover swung open, the microphone is also uncovered.

The positioning of the control keys 5 and 39 and the modelling of the cover 15 are such that the uncovered control keys 39 are most remote from the pivot axis 17 of the cover 15 and are not covered when the flap is in closed position.

Although the invention has been explained above with reference to only a single embodiment, the invention is nonetheless not restricted thereto. Within the scope of the appended claims, a great many different embodiments are possible for telephones having a cover which can both be slid and swung open. The cover 15, for example, could not have side portions 25.1, 25.2 which engage in the grooves of the housing side faces 27.1 and 27.2 respectively, but may be arranged such that housing sides engage in grooves of side faces of the cover. The top 43 of the cover 15 could have a profile, so that the sides 25.1 and 25.2 could be positioned over a larger distance alongside the side faces 27.1 and 27.2 of the housing 3 of the telephone and nevertheless leave the control keys 39 uncovered in closed position of the flap. In the main portion 21, the flap 15 could have openings for accessing certain control keys from the exterior while the flap is in closed position. In addition to said differences, there are many more differences possible within the scope of the appended claims.

I claim:

1. A telephone with a housing that comprises a plurality of coverable keys at the front and a cover movable between a closed position in which said control keys are covered and an open position in which the cover is flapped down around a pivot axis near to an edge of the housing, in which open position said control keys are accessible for operation, the cover being movable parallel to the housing between said closed position and an intermediate position, and the cover being pivotable around said pivot axis between the intermediate position and the open position, an angle between the cover in closed position and the cover in a maximally open position being formed such that the cover in the maximally open position forms a stable support for the telephone to put the telephone in a stable upright position on an underground.

2. A telephone as claimed in claim 1, wherein the cover in closed position comprises a main portion positioned substantially parallel to the front of the housing, and also side portions contiguous with the main portion near to the side edges, which side portions in closed position are located adjacent housing side faces contiguous with the front and in that the cover and the housing between said side faces of the cover and said side faces of the housing comprise mating guide portions for slidably guiding the cover on the housing between the closed position and the intermediate position and for allowing the pivoting option of the cover relative to the housing in the intermediate position.

3. A telephone as claimed in claim 1 or 2, wherein the cover in closed position leaves at least one control key uncovered.

4. A telephone as claimed in claim 3, wherein the uncovered control key(s) is (are) at maximum distance from the pivot axis of the cover.

5. A telephone as claimed in claim 1, wherein the angle is substantially ninety degrees.

* * * * *